(12) United States Patent
Lee

(10) Patent No.: US 11,199,701 B2
(45) Date of Patent: Dec. 14, 2021

(54) HEAD-UP DISPLAY APPARATUS

(71) Applicant: Coretronic Corporation, Hsin-Chu (TW)

(72) Inventor: Hung-Lin Lee, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 123 days.

(21) Appl. No.: 16/721,927

(22) Filed: Dec. 20, 2019

(65) Prior Publication Data

US 2020/0209618 A1    Jul. 2, 2020

(30) Foreign Application Priority Data

Dec. 26, 2018    (TW) .................................. 107147092

(51) Int. Cl.
*G02B 27/01*    (2006.01)
*B60K 35/00*    (2006.01)
*G02B 5/02*     (2006.01)

(52) U.S. Cl.
CPC .......... *G02B 27/0101* (2013.01); *B60K 35/00* (2013.01); *G02B 5/02* (2013.01); *B60K 2370/1529* (2019.05); *B60K 2370/166* (2019.05); *B60K 2370/178* (2019.05); *B60K 2370/23* (2019.05); *B60K 2370/334* (2019.05)

(58) Field of Classification Search
CPC ........ G02B 27/0101; B60K 2370/1529; B60K 35/00
See application file for complete search history.

(56) References Cited

U.S. PATENT DOCUMENTS

| 4,973,139 | A | 11/1990 | Weinhrauch et al. |
| 2014/0293431 | A1* | 10/2014 | Ishimoto ............... H04N 9/3129 359/630 |
| 2016/0120403 | A1* | 5/2016 | Mochizuki .............. G06F 3/013 351/209 |
| 2016/0170099 | A1* | 6/2016 | Yamaguchi ............... B60R 1/00 353/38 |
| 2016/0209649 | A1* | 7/2016 | Shigeno ............... G03B 21/006 |

(Continued)

FOREIGN PATENT DOCUMENTS

| CN | 104777614 | 7/2015 |
| CN | 106605166 | 4/2017 |
| CN | 106896506 | 6/2017 |

(Continued)

*Primary Examiner* — Ryan D Howard
(74) *Attorney, Agent, or Firm* — JCIPRNET

(57) ABSTRACT

A head-up display apparatus adapted to project an image light beam onto a target element is provided. The head-up display apparatus includes a display unit, a diffusion device, and an optical system. The display unit is adapted to provide the image light beam comprising a first light beam and a second light beam. The diffusion device includes a first diffusion region and a second diffusion region, and optical structures of the first and the second diffusion regions are different. The first diffusion region and the optical system are located on a transmission path of the first light beam and guide the first light beam to the target element to form a first image. The second diffusion region and the optical system are located on a transmission path of the second light beam and guide the second light beam to the target element to form a second image.

13 Claims, 5 Drawing Sheets

(56) References Cited

U.S. PATENT DOCUMENTS

2019/0107713 A1\* 4/2019 Sato .................. G02B 27/01
2020/0026075 A1\* 1/2020 Kim .................. G02B 27/0101

FOREIGN PATENT DOCUMENTS

| CN | 108957755 | 12/2018 |
|----|-----------|---------|
| TW | 201523029 | 6/2015 |
| TW | I582465 | 5/2017 |
| TW | I635321 | 9/2018 |

\* cited by examiner

HEAD-UP DISPLAY APPARATUS

CROSS-REFERENCE TO RELATED APPLICATION

This application claims the priority benefit of Taiwan application serial no. 107147092, filed on Dec. 26, 2018. The entirety of the above-mentioned patent application is hereby incorporated by reference herein and made a part of this specification.

BACKGROUND

Technical Field

The invention relates to a display apparatus, and particularly relates to a head-up display apparatus.

Description of Related Art

In today's society, besides vehicle performance, the requirements for vehicles are also focused on interiors and safety equipment. The assistance of today's technology products (such as a vehicle voice navigation system, a voice collision warning system, etc.) has indeed mitigated an accident rate caused by driver's long-term fatigue driving and inattention. At the same time, however, non-voice information display devices are usually installed on a dashboard, and when drivers look down, it may affect driving safety.

A head-up display (HUD) presents the information required by the driver in front of the driver, so that the driver does not have to bow or turn his head to check the information, which avails for the driving safety. When the driver drives a vehicle, images with different traffic information or auxiliary driving functions may be displayed at different positions of a windshield, and the driver may obtain corresponding information from the different positions of the windshield. However, in the current practice, the HUD is often equipped with multiple sets of image units for correspondingly projecting multiple images. Therefore, the number of parts of the HUD is too large, resulting in problems of high cost and huge volume, which also lead to a poor cooling effect of the HUD.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to a head-up display (HUD) apparatus, which has a function of augmented reality, and has reduced number of parts to reduce the cost, and occupies less space.

Other objects and advantages of the invention may be further illustrated by the technical features broadly embodied and described as follows.

In order to achieve one or a portion of or all of the objects or other objects, an embodiment of the invention provides a HUD apparatus adapted to project an image light beam onto a target element. The HUD apparatus includes a display unit, a diffusion device, and an optical system. The display unit is adapted to provide the image light beam. The image light beam includes a first light beam and a second light beam. The diffusion device is disposed on a transmission path of the image light beam. The diffusion device includes a first diffusion region and a second diffusion region, where the first and the second diffusion regions respectively have an optical structure, and the optical structure of the first diffusion region is different from the optical structure of the second diffusion region. The optical system is disposed on the transmission path of the image light beam. The diffusion device is located between the optical system and the display unit, where the first diffusion region and the optical system are located on a transmission path of the first light beam and guide the first light beam to the target element to form a first image. The second diffusion region and the optical system are located on a transmission path of the second light beam and guide the second light beam to the target element to form a second image.

In an embodiment of the invention, the display unit includes an optical engine module and a cooling module.

In an embodiment of the invention, the HUD apparatus further includes a processing unit, the processing unit is electrically connected to the display unit, and is adapted to adjust the first light beam and the second light beam, to make the first image and the second image to display in a same display direction or in opposite display directions.

In an embodiment of the invention, the diffusion device includes a first diffuser and a second diffuser, the first diffusion region is located at the first diffuser, and the second diffusion region is located at the second diffuser.

In an embodiment of the invention, the first light beam passes through the first diffusion region and is transmitted to the target element, and the second light beam passes through the second diffusion region and is transmitted to the target element.

In an embodiment of the invention, the first light beam is reflected by the first diffusion region and transmitted to the target element, and the second light beam is reflected by the second diffusion region and transmitted to the target element.

In an embodiment of the invention, the target element is a windshield of a vehicle, and is configured to receive the first light beam and the second light beam coming from the optical system.

In an embodiment of the invention, the first light beam is projected to a projection target through the target element and forms the first image on a first imaging plane, and the second light beam is projected to the projection target through the target element and forms the second image on a second imaging plane.

In an embodiment of the invention, the second light beam is combined with an environmental light beam through the target element for projecting to the projection target, and the second image formed on the second imaging plane is combined with a road image corresponding to the environmental light beam to form an augmented reality image.

In an embodiment of the invention, a distance of the second imaging plane relative to the projection target is greater than a distance of the first imaging plane relative to the projection target.

In an embodiment of the invention, the first image includes static traffic information such as a vehicle speed, a rotation speed or speed limitation.

In an embodiment of the invention, the second image includes dynamic traffic information such as an advanced driving assistance system, a lane departure warning system, a self-adjusting cruise control system, a navigation system or real-time traffic conditions.

In an embodiment of the invention, the optical system includes a plurality of reflecting elements configured to respectively transmit the first light beam and the second light beam coming from the diffusion device to different positions of the target element.

In an embodiment of the invention, a display surface of the display unit simultaneously displays a frame corresponding to the first image and corresponding to the second image.

Based on the above description, the embodiments of the invention have at least one of the following advantages or effects. In the HUD apparatus of the embodiments of the invention, the single display unit respectively provides the first light beam and the second light beam to the first diffusion region and the second diffusion region in the diffusion device, such that the first light beam and the second light beam are respectively guided to the target element to form the first image and the second image. Therefore, the number of parts in the display unit is reduced to reduce the cost, so as to reduce an occupation space of the whole HUD apparatus.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
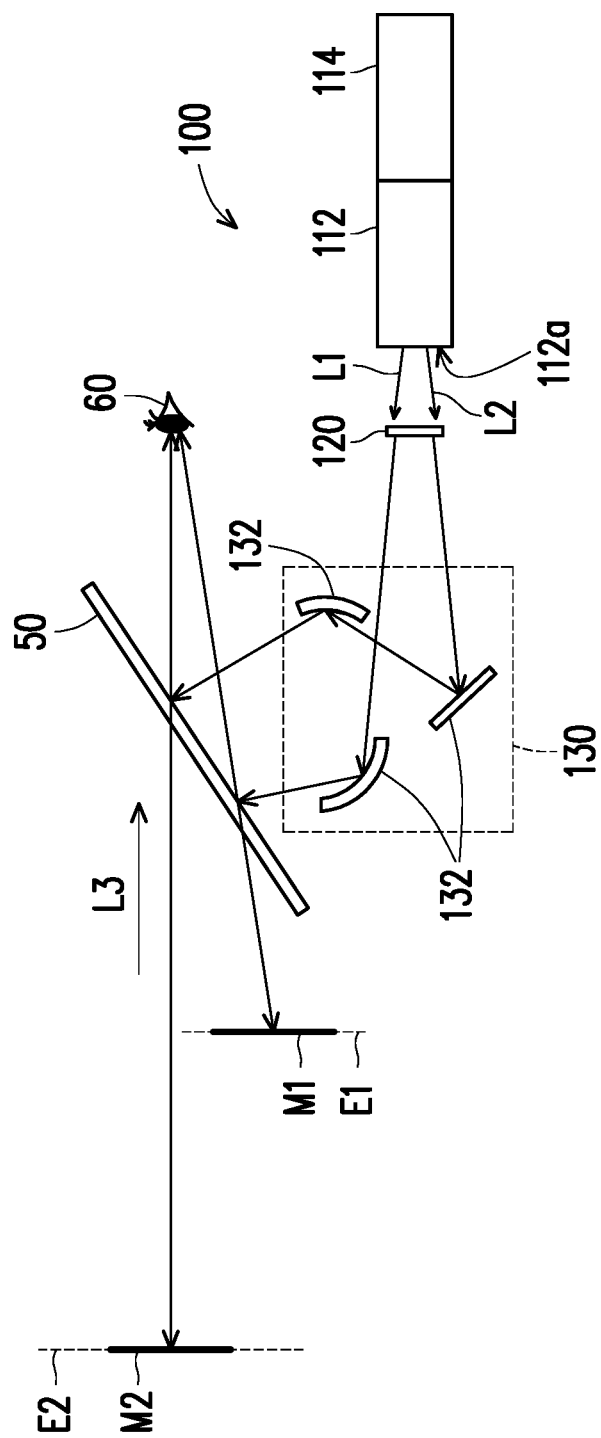
FIG. 1 is a schematic diagram of a HUD apparatus according to an embodiment of the invention.

FIG. 1 is a schematic diagram of a HUD apparatus according to an embodiment of the invention. Referring to FIG. 1, the HUD apparatus 100 of the embodiment is adapted to project an image light beam L onto a target element 50, and the target element 50 transmits the image light beam L to a projection target 60, such that the image light beam L forms a plurality of image frames on an imaging plane in front of the projection target 60 through the target element 50. In the embodiment, the HUD apparatus 100 is, for example, applied on a vehicle such as an automobile, etc. The target element 50 is, for example, a windshield on the automobile. The projection target 60 is, for example, eyes of a user (a driver or a passenger on the vehicle), though the invention is not limited thereto.

In the embodiment, the HUD apparatus 100 includes a display unit 110, a diffusion device 120, and an optical system 130. The display unit 110 is adapted to provide the image light beam L. The diffusion device 120 is disposed on a transmission path of the image light beam L, the optical system 130 is disposed on the transmission path of the image light beam L, and the diffusion device 120 is located between the optical system 130 and the display unit 110. The image light beam L provided by the display unit 110 is sequentially transmitted to the diffusion device 120 and the optical system 130. In the embodiment, the display unit 110 includes an optical engine module 112 and a cooling module 114. The optical engine module 112 is adapted to provide the aforementioned image light beam L, and the cooling module 114 is disposed on the optical engine module 112 to cool the optical engine module 112.

Figure 2:
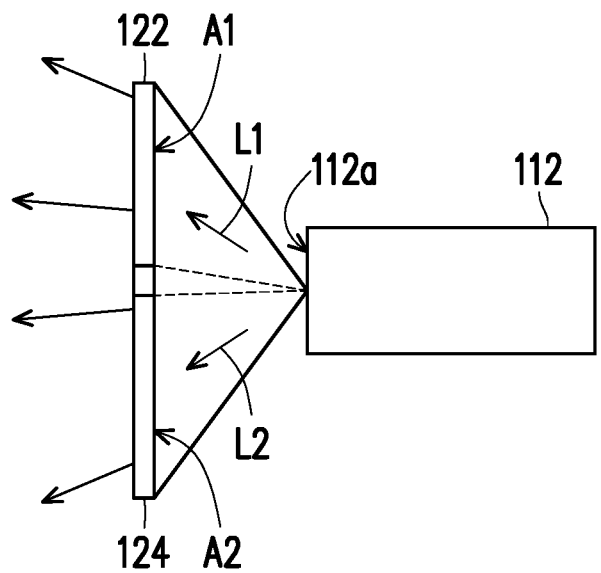
FIG. 2 is a schematic diagram of a part of the HUD apparatus of FIG. 1.
Figure 3:
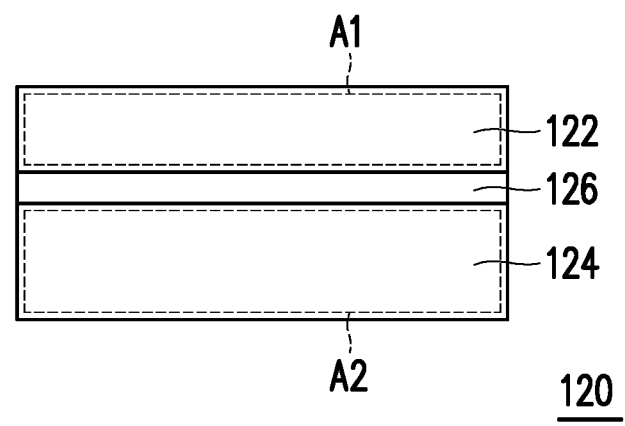
FIG. 3 is a schematic diagram of a diffusion device in the HUD apparatus of FIG. 1.

FIG. 2 is a schematic diagram of a part of the HUD apparatus of FIG. 1. FIG. 3 is a schematic diagram of the diffusion device in the HUD apparatus of FIG. 1. Referring to FIG. 1 to FIG. 3, in detail, the image light beam L provided by the display unit 110 includes a first light beam L1 and a second light beam L2. In the embodiment, transmission paths of the first light beam L1 and the second light beam L2 are different, and image information carried by the first light beam L1 and the second light beam L2 are also different. Namely, the display unit 110 simultaneously emits two different image light beams to the diffusion device 120.

The diffusion device 120 includes a first diffusion region A1 and a second diffusion region A2. The first diffusion region A1 is located on the transmission path of the first light beam L1, and guides the first light beam L1 to the optical system 130. The second diffusion region A2 is located on the transmission path of the second light beam L2, and guides the second light beam L2 to the optical system 130. In the embodiment, the first light beam L1 passes through the first diffusion region A1 and is transmitted to the target element 50 through the optical system 130, and the second light beam L2 passes through the second diffusion region A2 and is transmitted to the target element 50 through the optical system 130.

It should be noted that the first diffusion region A1 and the second diffusion region A2 respectively have an optical structure, and the optical structure of the first diffusion region A1 is different from the optical structure of the second diffusion region A2. In detail, a geometric surface (for example, a surface with roughness) or a particle diameter of diffusion particles of the first diffusion region A1 is different from a geometric surface (for example, a surface with roughness) or a particle diameter of diffusion particles of the second diffusion region A2. Therefore, the first light beam L1 and the second light beam L2 of different incident angles transmitted to the first diffusion region A1 and the second diffusion region A2 may have good optical effects. In other words, the respective optical structures of the first diffusion region A1 and the second diffusion region A2 of the diffusion device 120 may be further designed according to incident angles or diffusing angles of the first light beam L1 and the second light beam L2. Therefore, the image light beam L projected by the display unit 110 may be split into two projection light beams with different emitting angles by the diffusion device 120 through the respective different optical structures of the first diffusion region A1 and the second diffusion region A2. In this way, the number of the optical engine module 112 and the cooling module 114 may be reduced to reduce the cost, so as to reduce an occupation space of the whole HUD apparatus 100.

In the embodiment, the diffusion device 120 may further include a first diffuser 122 and a second diffuser 124, the first diffusion region A1 is located on the first diffuser 122, and the second diffusion region A2 is located on the second diffuser 124. In other words, the diffusion device 120 may be composed of two diffusers. In the embodiment, a connection portion 126 of a frame, an ink or other non-transparent material may be further utilized to connect the first diffuser 122 and the second diffuser 124, though the invention is not limited thereto. In other embodiments, the diffusion device may be a single diffuser, and a first diffusion region and a second diffusion region with different optical structures are configured on the single diffuser.

Referring to FIG. 1, the optical system 130 includes a plurality of reflecting elements 132 used for respectively transmitting the first light beam L1 and the second light beam L2 coming from the diffusion device 120 to different positions of the target element 50. To be specific, in the embodiment, the optical system 130 may be composed of two sets of optical transmitting elements respectively corresponding to the first light beam L1 and the second light beam L2. However, in some embodiments, the two sets of optical transmitting elements respectively corresponding to the first light beam L1 and the second light beam L2 may also share the same optical elements such as the reflecting elements 132, etc., which is not limited by the invention.

Figure 4:
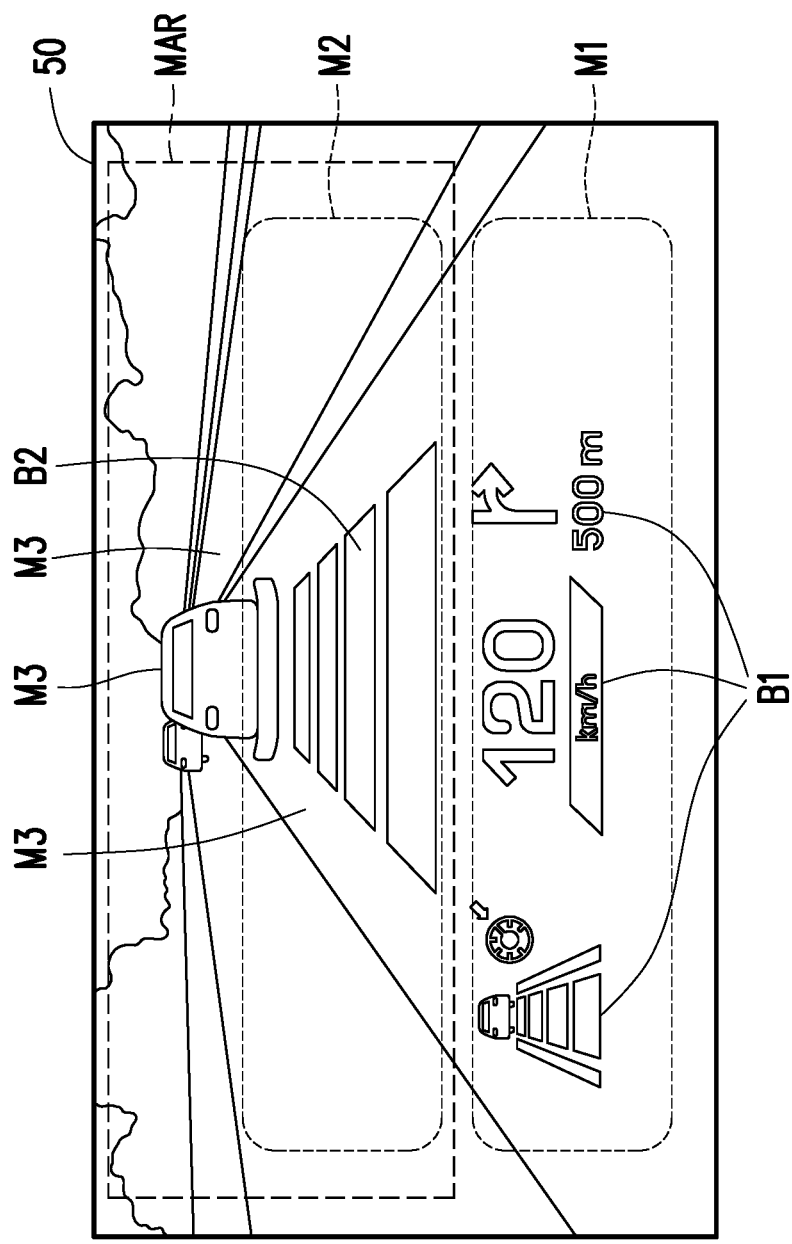
FIG. 4 is a schematic diagram of an image displayed on a target element according to an embodiment of the invention.

FIG. 4 is a schematic diagram of an image displayed on the target element according to an embodiment of the invention. Referring to FIG. 1 and FIG. 4, the target element 50 receives the first light beam L1 and the second light beam L2 coming from the optical system 130, and the first light beam L1 is guided to the target element 50 by the first diffusion region A1 of the diffusion device 120 and the optical system 130 to form a first image M1, and the second light beam L2 is guided to the target element 50 by the second diffusion region A2 of the diffusion device 120 and the optical system 130 to form a second image M2. In detail, the first light beam L1 is projected to the projection target 60 through the target element 50 and forms the first image M1 on a first imaging plane E1, and the second light beam L2 is projected to the projection target 60 through the target element 50 and forms the second image M2 on a second imaging plane E2. Therefore, in the embodiment, the user's eyes (the projection target 60) may observe the first image M1 and the second image M2 located on the imaging planes of different distances through the windshield (the target element 50), i.e. the user (driver)'s eyes may view two virtual images (the first image M1 and the second image M2) in front of the windshield. In other words, a display surface 112a of the display unit 110 of the HUD apparatus 100 simultaneously displays a frame corresponding to the first image M1 and corresponding to the second image M2.

In the embodiment, a distance of the second imaging plane E2 relative to the projection target 60 is greater than a distance of the first imaging plane E1 relative to the projection target 60.

The first image M1 may display resident patterns B1 including a vehicle speed, a rotation speed or speed limitation, etc. Namely, the first image M1 may be an image frame containing static traffic information such as the vehicle speed, the rotation speed or the speed limitation, etc. The second image M2 may display indication patterns B2 including an advanced driving assistance system, a lane departure warning system, a self-adjusting cruise control system, a navigation system or real-time traffic conditions, etc. Namely, the second image M2 may be an image frame containing dynamic traffic information such as the advanced driving assistance system, the lane departure warning system, the self-adjusting cruise control system, the navigation system or the real-time traffic conditions, etc., as that shown in FIG. 4. It should be noted that in the embodiment, the second light beam L2 is combined with an environmental light beam L3 through the target element 50 for projecting to the projection target 60, and the second image L2 formed on the second imaging plane E2 is combined with a road image M3 including a road, vehicles or traffic facilities in the environment and corresponding to the environmental light beam L3 to form an augmented reality image MAR. In detail, the target element 50 may be a transflective element or a windshield, and the environmental light beam L3 passes through the target element 50 and is combined with the second light beam L2 reflected by the target element 50 for being transmitted to the projection target 60, i.e. the user's eyes may view image information (the second light beam) presented by the display unit 110 and environmental information (the environmental light beam) outside the vehicle. In this way, display and assisting effects of the image frame containing the dynamic traffic information are further enhanced, thereby improving the safety of driving the vehicle.

Figure 5:
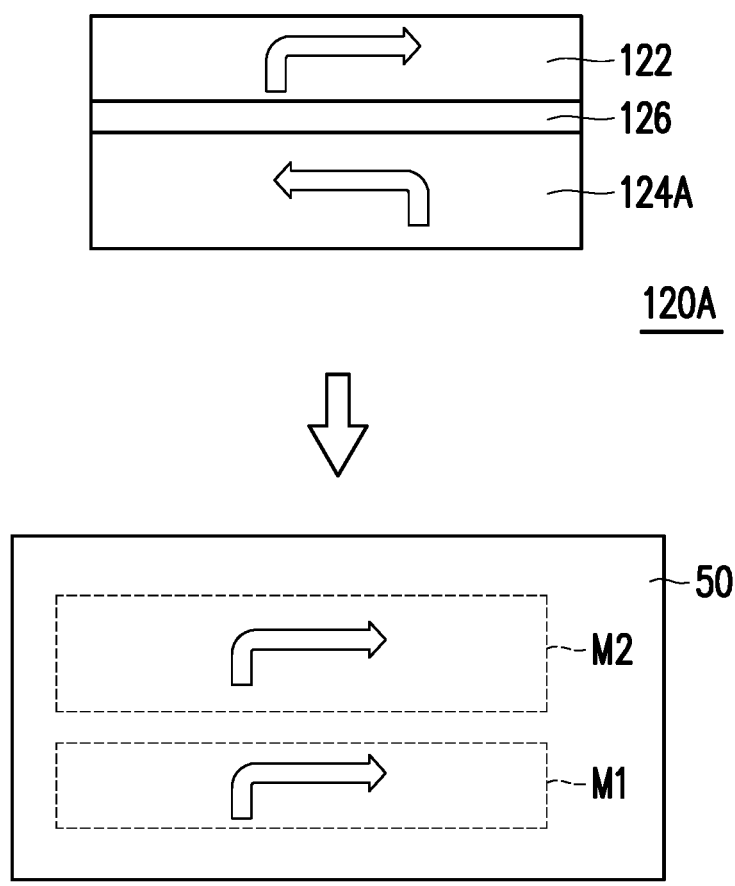
FIG. 5 is schematic diagram of a diffusion device and an image displayed on the corresponding target element according to another embodiment of the invention.

FIG. 5 is schematic diagram of a diffusion device and an image displayed on the corresponding target element according to another embodiment of the invention. Referring to FIG. 1 and FIG. 5, the diffusion device 120A of the embodiment is at least applied to the HUD apparatus 100 of FIG. 1, so that the HUD apparatus 100 of FIG. 1 is taken as an example for description, though the invention is not limited thereto. In the embodiment, the HUD apparatus 100 further includes a processing unit (not shown), which is electrically connected to the display unit 100, and is adapted to adjust a direction of projecting frames of the first light beam L1 and the second light beam L2 to an opposite direction. The processing unit is, for example, a Central Processing Unit (CPU), a microprocessor, a Digital Signal Processor (DSP), a programmable controller, a Programmable Logic Device (PLD) or other similar device or a combination of the above devices, which is not limited by the invention.

In detail, since the first light beam L1 and the second light beam L2 are respectively projected to the target element 50 by at least one different part in the optical system 130, the first image M1 and the second image M2 obtained by the user through the projection target 60 at different distances probably have different display directions. However, in the embodiment, through the adjustment of the processing unit, the first image M1 and the second image M2 may have a same display direction. For example, in the embodiment, the processing unit may adjust a display direction of the second light beam L2 for presenting the second image M2. Therefore, the second diffuser 124A in the diffusion device 120A displays the second light beam L2 with the display direction different from the display direction of the first light beam L1. In other words, through the adjustment of the processing unit, the first light beam L1 and the second light beam L2 are adapted to various different optical systems 130 and combinations of various different imaging distances, such that the first image M1 and the second image M2 are displayed in the same display direction or in the opposite display directions. In this way, a situation that the first light beam L1 and the second light beam L2 produce the first image M1 and the second image M2 with different display directions or reversed text due to limitation of the optical system 130 or the imaging distance is avoided, so as to further improve security for driving the vehicle. In the embodiment, the processor may receive signals coming from sensing elements (for example, cameras, GPS, etc.) configured on the vehicle to synchronously obtain image frames in front of the vehicle and resident patterns B1 such as a current vehicle speed, a rotation speed, etc., and the processor may integrate the above image frames and the resident patterns B1 to same image data for transmitting to the display unit 110. In this way, the display surface 112a may simultaneously display a frame corresponding to the first image M1 and corresponding to the second image M2.

Figure 6:
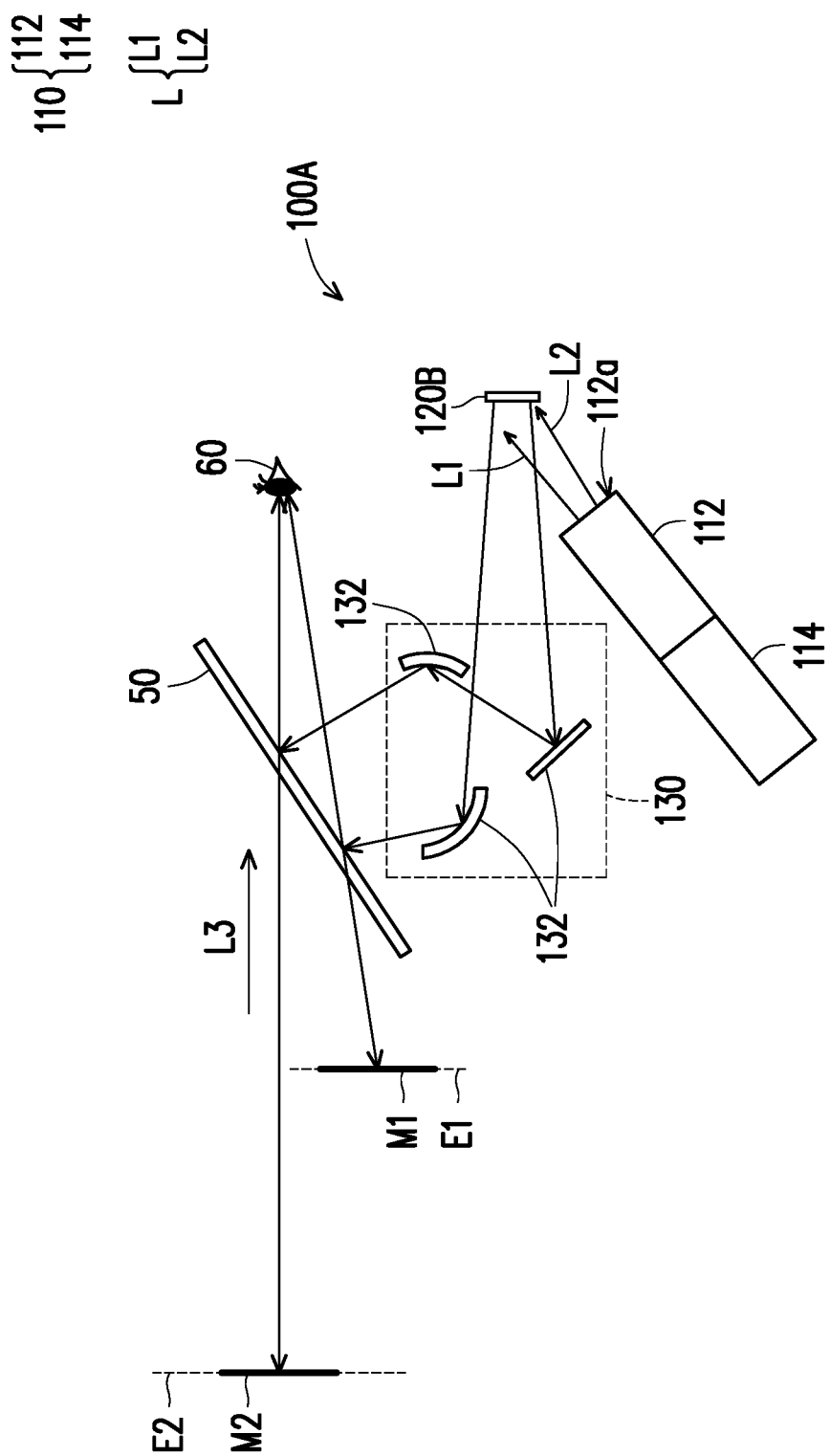
FIG. 6 is a schematic diagram of a HUD apparatus according to another embodiment of the invention.

FIG. 6 is a schematic diagram of a HUD apparatus according to another embodiment of the invention. Referring to FIG. 6, the HUD apparatus 100A of the embodiment is similar to the HUD apparatus 100 of FIG. 1, and a difference there between is that in the embodiment, the first diffusion region A1 (referring to the first diffusion region A1 of FIG. 2) of the diffusion device 120B of the HUD apparatus 100A reflects the first light beam L1 for transmitting to the optical system 130, and the second diffusion region A2 (referring to the second diffusion region A2 of FIG. 2) reflects the second light beam L2 for transmitting to the optical system 130. In other word, in the embodiment, the diffusion device 120B is composed of reflective diffusers, though the invention is not limited thereto. In other embodiments, the diffusion device 120B may also be composed of two reflective diffusers, which is not limited by the invention.

In summary, the embodiments of the invention have at least one of the following advantages or effects. In the HUD apparatus of the embodiments of the invention, the single display unit respectively provides the first light beam and the second light beam to the first diffusion region and the second diffusion region in the diffusion device, such that the first light beam and the second light beam are respectively guided to the target element to form the first image and the second image. Therefore, the number of parts in the display unit is reduced to reduce the cost, so as to reduce an occupation space of the whole HUD apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A head-up display apparatus, adapted to project an image light beam onto a target element, the head-up display apparatus comprising:
a display unit, adapted to provide the image light beam, wherein the image light beam comprises a first light beam and a second light beam;
a diffusion device, disposed on a transmission path of the image light beam, and comprising a first diffuser corresponding to a first diffusion region, a second diffuser corresponding to a second diffusion region, and a connection portion connecting between the first diffuser and the second diffuser, wherein the first diffusion region and the second diffusion region respectively have an optical structure, and the optical structure of the first diffusion region is different from the optical structure of the second diffusion region; and an optical system, disposed on the transmission path of the image light beam, and the diffusion device being located between the optical system and the display unit, wherein the first diffusion region and the optical system are located on a transmission path of the first light beam and guide the first light beam to the target element to form a first image, and the second diffusion region and the optical system are located on a transmission path of the second light beam and guide the second light beam to the target element to form a second image.

2. The head-up display apparatus as claimed in claim 1, wherein the display unit comprises an optical engine module and a cooling module.

3. The head-up display apparatus as claimed in claim 1, further comprising:

a processing unit, electrically connected to the display unit, and adapted to adjust the first light beam and the second light beam to make the first image and the second image to display in a same display direction or in opposite display directions.

4. The head-up display apparatus as claimed in claim 1, wherein the first light beam passes through the first diffusion region and is transmitted to the target element, and the second light beam passes through the second diffusion region and is transmitted to the target element.

5. The head-up display apparatus as claimed in claim 1, wherein the first light beam is reflected by the first diffusion region and transmitted to the target element, and the second light beam is reflected by the second diffusion region and transmitted to the target element.

6. The head-up display apparatus as claimed in claim 1, wherein the target element is a windshield of a vehicle, and is configured to receive the first light beam and the second light beam coming from the optical system.

7. The head-up display apparatus as claimed in claim 1, wherein the first light beam is projected to a projection target through the target element and forms the first image on a first imaging plane, and the second light beam is projected to the projection target through the target element and forms the second image on a second imaging plane.

8. The head-up display apparatus as claimed in claim 7, wherein the second light beam is combined with an environmental light beam through the target element for projecting to the projection target, and the second image formed on the second imaging plane is combined with a road image corresponding to the environmental light beam to form an augmented reality image.

9. The head-up display apparatus as claimed in claim 7, wherein a distance of the second imaging plane relative to the projection target is greater than a distance of the first imaging plane relative to the projection target.

10. The head-up display apparatus as claimed in claim 1, wherein the first image comprises static traffic information including at least one of vehicle speed, rotation speed or speed limitation.

11. The head-up display apparatus as claimed in claim 1, wherein the second image comprises dynamic traffic information including at least one of such as an advanced driving assistance system, a lane departure warning system, a self-adjusting cruise control system, a navigation system or real-time traffic conditions.

12. The head-up display apparatus as claimed in claim 1, wherein the optical system comprises a plurality of reflecting elements configured to respectively transmit the first light beam and the second light beam coming from the diffusion device to different positions of the target element.

13. The head-up display apparatus as claimed in claim 1, wherein a display surface of the display unit simultaneously displays a frame corresponding to the first image and corresponding to the second image.

* * * * *